M. E. EVANS
ATTENUATION OF MATERIALS
May 24, 1932.
Re. 18,478
Original Filed Nov. 29, 1921
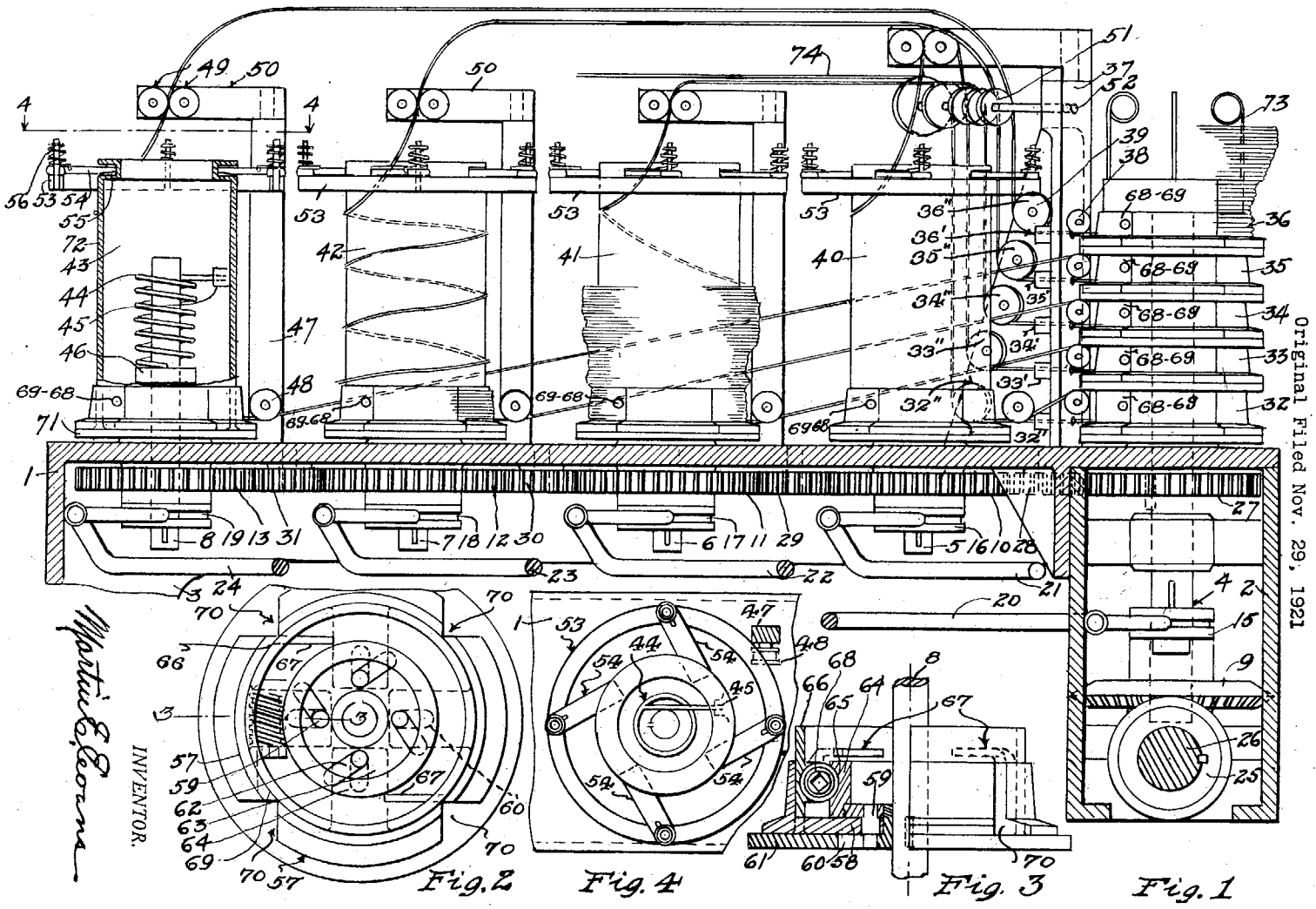
INVENTOR.
Martin E. Evans Reissued May 24, 1932 Re. 18,478

UNITED STATES PATENT OFFICE

MARTIN E. EVANS, OF PITTSBURGH, PENNSYLVANIA

ATTENUATION OF MATERIALS

Original No. 1,666,928, dated April 24, 1928, Serial No. 518,687, filed November 29, 1921. Application for reissue filed April 23, 1930. Serial No. 446,774.

This invention relates to attenuation of material and, in particular, to its application to wire drawing.

Wire drawing, as at present practiced, is accomplished by depositing a coil of wire to be drawn on a reel on the floor, pointing the end, passing the end through a suitable lubricant and a die, and then securing the end to a rotatable drum. After drawing, the coil of wire on the drum is removed and again deposited on the floor reel and the operation repeated until the desired fineness is secured. This obviously involves much manual handling of the wire, also considerable delay and danger to the operator, as coils in heavy stock are apt to spring in any direction when released.

It has been proposed to supplant most of the manual labor and overcome the attendant danger by continuous drawing, that is, by providing a number of drums and dies and leading the wire from one to the next in succession. As the wire varies in the length to which it is drawn, accumulating means for maintaining a variable reserve for each die must be provided.

This invention has for its principal objects, providing a continuous drawing apparatus with accumulating means capable of maintaining a variable reserve; and providing accumulating means that may be independent of the drawing drum. In another aspect, this invention contemplates an arrangement of a plurality of drawing blocks and dies which are capable of use in various combinations. In still another aspect, this invention has for its object a compact arrangement of drawing blocks and dies with the necessary variable accumulating means.

In the drawings,

Figure 1 is an elevation of a drawing bench;

Fig. 2 is a plan view of a drum construction;

Fig. 3 is an elevation of the drum, one half being shown in section on the line 3—3 of Figure 2;

Fig. 4 is a horizontal section on line 4—4 of Figure 1;

The apparatus here chosen for illustration of an embodiment of the invention comprises a bench 1 supported on one end by a box-like member 2 and at the other by a leg 3. Box-like member 2 may be the ordinary drawing bench to which the other members are attached. Supported in bearings on the bench are vertical shafts 4, 5, 6, 7 and 8, each loosely carrying a gear 9, 10, 11, 12 and 13, respectively, and a clutch 15, 16, 17, 18 and 19, respectively, for connecting the gear to the shaft. Operating handles 20, 21, 22, 23 and 24 control the clutches. These handles have projections extending the full width beneath the bench so that they may be operated from either side. The gear 9 on the main shaft 4 is a bevel gear driven from another like gear 25 on a driving shaft 26. The remaining shafts are driven from the shaft 4 by a gear 27 keyed to the shaft 4 and the connecting pinions 28, 29, 30 and 31.

On the extension of the main shaft 4, above the bench, are mounted to rotate therewith a series of drawing drums 32, 33, 34, 35 and 36. Adjacent the drums is a die-holding member 37 having dies correspondingly numbered 32′, 33′, 34′, 35′, 36′, one for each drum. A drum and its associated die thus constitute an attenuating means for the material, the drum serving to draw the material through the die. This member also carries rollers or guides correspondingly numbered 32″, 33″, 34″, 35″, 36″, for directing the wire to the dies, and rollers 38 for guiding wire from the drums. The dies used are those commonly used and well known in the art.

On each of the shafts 5, 6, 7 and 8 is placed a support or accumulator 40, 41, 42 and 43. Each of these is rotated from the shaft by a spring 44, one end 45 being secured to the accumulator and the other end to a collar 46 keyed or secured by friction engagement to the shaft. The purpose of this spring is to maintain a continuous tension on the wire to compel the wire to climb up the accumulator and also to yield to any back pull. Associated with each accumulator is a member 47 carrying a roller 48 to guide wire to the accumlator and rollers 49 on a removable arm 50 to guide the wire from the accumulator.

For the accumulator nearest the drums, the member 37 is utilized for holding the guiding rollers and removable arm. The member 37 also carries a series of rollers 51 on a shaft 52 for supporting wire leading from the various accumulators.

A feature of the accumulator is take-off means for controlling the removal of wire from it to correspond with the demand. Various constructions are possible for such a take-off and one specific form is here illustrated. This comprises a ring 53 surrounding the upper end of the accumulator, on which ring are pivotally mounted fingers or flippers 54. These flippers project inwardly into pockets 55 formed in the accumulator and are held in the pockets by springs 56. The flippers there support the ring about the accumulator but can be pushed out of contact with the pockets to permit passage of wire. In this construction, the ring rotates with the accumulator. These flippers prevent the wire from flying around the accumulator drum and hold the wire there until a longitudinal movement of the wire upward from the accumulator causes a lateral thrust upon the flipper and moves it from its pocket. The wire is then released to contact with a second flipper.

A construction herein shown for the drum is an expansible one so that any drum may be varied in diameter to vary peripheral speeds and consequent rates of drawing wire. This is secured by having the wire engaging part of the drum split into a number of sectors 57 each having an inward extension 58. A pin 59 is carried by this extension which slides in a radial groove 60 in the base plate 61 of the drum. The sectors are consequently moved in a radial direction. To prevent wire coils falling within the sectors, arms 67 are attached to them. Pin 59 also slides in a diagonally placed groove 62 in a superimposed ring plate 63. This ring plate has a vertical collar 64 extending from it in which circular rack 65 is formed. Fitted within the sectors 57 is a sleeve 66 which is secured from movement to the base plate; and this sleeve carries a worm 68 that engages the circular rack 65. Rotation of the worm then turns the ring plate 63. The diagonal engagement with the pin causes it to move radially during this rotation as the pin is constrained so as to move by the groove 60 in the base plate. The sectors are consequently moved in a radial direction. As illustrated in Fig. 2 and Fig. 3, the four sectors 57 are moved in a radial direction by the cooperation of four pins 59 (a pin secured to each sector) with the corresponding radial four slots 60 in base plate 61, and the correspondingly angular four slots 62 in ring plate 63. Rotation of worm 68 in engagement with rack 65, rotates ring 64 and ring plate 63, thus imparting movement through the slot action on pins 59 to the four sectors 57.

Access to the worm to turn it is provided by an opening 69 in the wall of upstanding ring 66. Between the sectors are openings 70 into which strippers for removing coils of wire, as on the drum 36, may be inserted.

Preferably, each drawing drum and each accumulator base portion 71 is given the expansible construction for adjustment purposes and to vary peripheral speeds as requirements dictate. The sectors are made tapering so that, as the wire coils are forced up by the newly laid coil, their grip on the sectors is lessened. To care for the accumulation of wire, each accumulator has a cylindrical portion 72 of adequate extent.

The final coil of wire is preferably retained on the last drawing drum by the usual means of removable pins 73 inserted in the drum. When all the wire has collected on this drum, it is removed by withdrawing the pins.

In operation, after being pointed, the wire 74 is led from a reel not shown through the first die 32′ to the drum 32 to which it is secured by a grip in a manner well known in the art. After a sufficient number of turns have collected on the drum to insure sufficient traction for drawing through the die, the wire is led to the first accumulator 40 and coiled thereon under slight tension secured by tensioning the spring 44 as the initial end of the wire is attached to the expansible drum 71. Tensioning of spring 44 is accomplished by placing a lever in opening 69 and pressing thereon to rotate 70 and 71, when the lower end of the spring is held stationary by engagement through collar 46 and accompanying shaft to its individual drive clutch. Release of the clutch automatically releases the tension and allows the accumulator to rotate freely. After a number of turns have gathered on the accumulator sufficient to take care of variations in length of wire produced in the second drawing operation, it is led through the next die 33′ to the next drum 33, and from this drum to the next accumulator 41, and so on through successive dies and around correspondingly drawing drums and accumulators.

The wire leaving the accumulator is passed within the ring 53, so each coil of wire on its removal must move the flippers in succession. These flippers then prevent the departing wire from continued movement around the accumulator, as they respond only to a side-wise thrust caused by the removal of the wire. For the same reason, they prevent undue enlargement of the coils on the accumulator due to the uncoiling tendency inherent in the wire. These flippers then control the wire and only permit its release upon the demand of the succeeding drawing operation. Rapid rotation of the accumulator and the accumulated wire tends through centrifugal force to remove the departing wire from contact with the accumulator drum in which case ring 53 serves to limit the radial movement of the wire.

With this arrangement, it is not necessary to use all the drawing drums and accumulators on a bench, nor is the single wire operated or limited to a single bench. If, for instance, only two drawing operations are to be performed on a wire, only two of the drums are used and the remaining drums may be used for another wire. An illustration of simultaneous operations drawing two wires is shown by starting with the machine empty of wire. Upon accumulator drum 41 after removing ring 53 with flippers 54, a bundle of wire is placed by means not shown and ring 53 replaced in position with flippers 54 in engagement with accumulator 41. The upper end of the wire is then pointed, by means not shown, passed up between flippers 54, ring 53 and accumulator 41 to the passage between axially positioned guide rolls 49 over accumulator 41 and thence to one of guide rolls 51, down to guide roll 32″, to die 32′ and around drum 32 which draws it through die 32′ and passes it on to expansion block on the bottom of accumulator 40 from which it creeps up in coils and accumulates on accumulator 40. After a sufficient number of coils have accumulated to form a variable supply for further drafting on accumulator 40 the end of the wire thereon is pointed and in a manner as previously described, directed back to die 36′, wound around drum 36 and as drawn thereon, collected around pins 73.

Similarly, after removing ring 53 with flippers 54 from accumulator 43 a bundle of wire is placed thereon, then ring 53 and flippers 54 are replaced on accumulator 43, the wire is then pointed and passed within ring 53 between rolls 49 disposed axially over accumulator 43, thence to one of guide rolls 51 and down to guide 33″, to die 33′, and around drum 33 from which it passes to the expansion block on accumulator 42 and gradually accumulates on member 42. Thus two wires pass from accumulators acting as storage reels to the dies, drums, and back to adjacent accumulators in accordance with choice freely made in agreement with varying operating conditions. Any combination of drums may be made on the one bench or in connection with drums on a contiguous bench; and such selection may be made in accordance with the die plates associated with the drums. Any drawing drum and its corresponding accumulator may be given a peripheral speed through adjustments of expansible blocks suitable to take up all the portions of wire as drawn and accumulated on a preceding drum and accumulator, except such length as may be allowed to remain to compensate for variations in demand during the drawing operation. The successive drafts may be made at rates which do not allow any appreciable amount of intermediate accumulation of wire. Other adjustments of peripheral speeds may give a great amount of intermediate accumulation. In fact, the flexibility of operation secured by adjustment of peripheral speeds, or by threading the wire or wires in various paths, or by the tension adjustments, or by a combination of these adjustments is sufficient to meet all the varied requirements of operation imposed by the physical characteristics of the material operated on. As an instance, tension on the accumulator drum may be adjusted to act as an aid to securing traction between the wire and the drawing drum. Again, the tension on the wire between drawing drum and the accumulator drum may be dispensed with and the wire wound around the upper part of the accumulator gradually coiling downward; the coils are to be withdrawn in the same order as they are placed on the accumulator. So it is at once apparent that the flexibility of operation permits of continuous wire drawing, multiple wire drawing, or multiple continuous wire drawing.

The number of benches, drawing drums, and accumulators may, of course, be varied to suit conditions. Furthermore, the apparatus is not limited to the drawing of material or to the action on wire but is adapted for other operations, such as rod rolling, and for other material.

The invention claimed is:—

1. An apparatus for attenuating material of rod-like form comprising in combination: a plurality of coaxially mounted drawing drums, dies associated with each of said drums, and an accumulator for each pair of drawing drums to hold material taken off one of the drums constituting a pair and to supply material to the other drum of the pair.

2. A rotatable accumulator for material of rod-like form comprising in combination: a rotatable base, an adjustable diameter drum mounted on said base, a driving shaft and a yielding connection between said shaft and base for yieldingly rotating said base and drum.

3. A take-off device for a material accumulator having depressions formed therein comprising in combination: a member surrounding the accumulator and spring-pressed flippers carried by said member and cooperating with the depressions in the accumulator for supporting the member from the accumulator and for controlling the take-off of material from the accumulator.

4. A take-off device for a cylindrical material accumulator having pockets formed therein comprising in combination: a ring surrounding the accumulator and spring-pressed flippers carried by said ring for yieldably engaging the pockets to support the ring from the accumulator and to control the take-off of material from the accumulator.

5. A take-off device for a material accumulator comprising in combination: a material restraining member, pivoted means associating said member with the accumulator and supporting said member from the accumulator and adapted to contact with material on the accumulator.

6. A take-off device for a material accumulator comprising in combination: an annular member disposed in concentric relation to and supported from said accumulator, said annular member carrying pivoted members for restraining movement of material from the accumulator.

7. A take-off device for an accumulation of material comprising in combination: an annular member disposed in concentric relation to the material, a support for the material operative to support the annular member, said annular member cooperating with pivoted members for restraining movement of material from the accumulation.

8. An apparatus for attenuating material of rod-like form comprising in combination: a plurality of coaxially mounted drawing drums, dies associated with said drums, and means for variably providing material apart from said drums for said dies.

9. An apparatus for attenuating material comprising in combination, attenuating means and an accumulator associated with said means, said accumulator including a rotatable base, a material support mounted on said base, and a spring connecting the support with the base for yieldingly rotating the support.

10. An apparatus for attenuating material comprising in combination: a drawing drum and cooperating die, a second drawing drum and cooperating die, an accumulator for the variable accumulation of said material between said pair of dies, means for supporting the drawing drums and separate independent means for supporting the accumulator.

11. An apparatus for attenuating material comprising in combination: a drawing drum and cooperating die, a second drawing drum and cooperating die, an accumulator for the variable accumulation of said material between said pair of dies, means for rotatably mounting said drums and separate and independent means for mounting said accumulator.

12. An apparatus for attenuating material comprising in combination, a drawing drum and co-operating die, a second drawing drum and cooperating die, and an accumulator for the variable accumulation of said material between said dies, means for driving said drums, and separate and independent means for driving said accumulator, said last mentioned means including a clutch.

13. An attenuating apparatus comprising in combination, a plurality of dies, a plurality of drawing drums secured to a common shaft and driven therefrom, each drum adapted for drawing single and individual strips through said dies, and accumulators for coiling such strips in separate accumulations, one accumulator being associated with the common winding means.

14. An apparatus for attenuating material comprising in combination: a drawing drum and cooperating die, a second drawing drum and cooperating die, an accumulator for the variable accumulation of material from one of said drawing drums and for variable delivery of said material to the other of said drums, means for driving said drums and separate and independent means for driving said accumulator.

15. Apparatus for attenuating material in rod-like form comprising in combination: a pair of dies, rotating means for drawing said material through said dies, a rotating accumulator for the variable accumulation of said material between said pair of dies, said accumulator being separate from said rotating means for drawing material through said dies, and means for adjusting the accumulator to receive said material in accordance with the rate of attenuation by the die preceding said accumulator.

16. Apparatus for attenuating material in rod-like form comprising in combination: a pair of dies, rotating means for drawing said material through said dies, including means for changing the speed of drawing, a rotating accumulator for the variable accumulation of said material between said pair of dies, said accumulator having adjustable means to change its receiving speed of operation to be in accord with the different speeds for drawing said material through the die delivering to said accumulator.

17. An apparatus for attenuating material in rod-like form comprising in combination: a drawing drum and co-operating die, a second drawing drum and cooperating die, an accumulator for the variable accumulation of said material between drafting by said pair of dies, and driving means separate and independent of either drawing drum for said accumulator.

18. In a material attenuating machine in combination: a wire drawing die and drum, means for mounting said drum, an accumulator for variable accumulation of wire from said drum, independent and separate mounting for said accumulator, and means provided on said accumulator to release the wire for lineal movement and for retaining the wire not released in position on said accumulator.

19. In wire drawing apparatus the combination of a plurality of dies, a plurality of drawing drums on a common shaft, one of said drums having radial sectors for varying its diameter, and means for variably providing material apart from said drums for said dies.

20. In a wire drawing apparatus, the combination of a series of dies, a series of drawing drums on a common shaft, an accumulator between said dies to supply material to the succeeding die, driving connections including a clutch between said drums and accumulator, means to relatively change the speed of drawing of said drums and means to relatively change the speed of receiving of said accumulator whereby the speed of drawing and coiling on accumulator is the same.

21. An attenuating apparatus comprising in combination: a plurality of dies, a plurality of drawing drums secured to a common shaft and driven therefrom, each drum adapted for drawing single and individual strips through said dies, accumulators for collecting said strips in separate accumulations, and means for releasing said strips, as required for further attenuation during the attenuating operation.

22. An accumulator drum adapted to variably discharge a reserve supply of wire, said drum comprising a concentrically arranged ring, a flanged hub secured to the body of said drum, members pivotally mounted on said ring, and means yieldably urging said members against said hub.

23. An apparatus for attenuating material, comprising in combination a plurality of power driven drawing drums, dies associated with said drawing drums, at least one separate power driven accumulator drum in operative relation between one of said drawing drums and a succeeding die for accumulating material from said last mentioned drawing drum and providing a variable supply of material apart from said drawing drum for said last mentioned die.

24. An apparatus for attenuating material comprising in combination a plurality of power driven drawing drums, dies associated with said drawing drums, at least one separate power driven accumulator drum in operative relation between one of said drawing drums and a succeeding die for accumulating material from said last mentioned drawing drum and providing a variable supply of material apart from said drawing drum for said last mentioned die, and means for independently varying the peripheral movement of the drawing drums and accumulator drum.

25. An apparatus for attenuating material comprising in combination a plurality of power driven drawing drums, dies associated with said drums, and separate power driven accumulator drums for variably providing material apart from said drawing drums for said dies.

26. An apparatus for attenuating material comprising in combination a plurality of power driven drawing drums, dies associated with said drums, and separate power driven accumulator drums for variably providing material apart from said drawing drums for said dies, and means for varying the peripheral movement of the drawing and accumulator drums.

27. A metal strip treating apparatus comprising in combination, a metal strip treating means, a power driven drawing drum for drawing the strip from said means, an axis for said drum, a separate power driven accumulator drum, a second axis for said accumulator drum and a second metal strip treating means, said accumulator receiving and accumulating metal strip from said drawing drum and providing a supply to said second treating means at a lineal speed independent of the lineal speed produced by said drawing drum.

28. An apparatus for attenuating metal strip comprising in combination, an attenuating means for working and applying a feed rate to said strip, a second attenuating means, and a separate power driven accumulator adapted to receive strip from said first attenuating means in accord with the rate of attenuation by said means and to accumulate and variably supply said strip for attenuation in accord with demands therefor by said second means, whereby said first and second attenuating means are freed from close speed regulation incident to simultaneous attenuation on said strip, said accumulator having an axis apart from axis that either attenuating means may carry.

29. An apparatus for treating metal strip comprising in combination, a metal strip treating means applying a feed rate to said strip, a die, a power driven drawing drum, and a separate power driven accumulator receiving and accumulating metal strip from said treating means and providing a variable supply to said die in accord with the drawing of said strip through said die by said drawing drum.

30. An apparatus for attenuating metal strip comprising in combination, a metal strip treating means applying a feed rate to said strip, a die, a power driven drawing drum, and a separate power driven accumulator receiving and accumulating attenuated strip from said drawing drum and providing a supply to said treating means at a lineal rate to promote said accumulation whereby said treating and drawing are accomplished on a single strip simultaneously at different rates.

31. An apparatus for attenuating material comprising in combination an elongated power driven drawing drum, dies associated with said elongated drum each cooperating with its appointed section thereof, at least one separate power driven accumulator drum in operative relation between one of said drawing drum sections and a succeeding die for accumulating material from said last mentioned drawing drum section and providing a variable supply of material apart from said drawing drum for said last mentioned die.

32. An apparatus for attenuating material comprising in combination a plurality of power driven drawing drums, dies associated with said drawing drums, at least one separate power driven accumulator drum in operative relation between one of said drawing drums and a succeeding die for accumulating material from said last mentioned drawing drum and providing a variable supply of material apart from said drawing drum for said last mentioned die; and a means for coordinating the peripheral speeds of said last mentioned drawing drum and said accumulator drum.

MARTIN E. EVANS.